(12) United States Patent
Litz et al.

(10) Patent No.: US 9,880,556 B2
(45) Date of Patent: Jan. 30, 2018

(54) TEST METHOD AND SYSTEM USING A HIGHLY AGILE GROUND VEHICLE FOR INTELLIGENT VEHICLE TESTING

(71) Applicant: MTS Systems Corporation, Eden Prairie, MN (US)

(72) Inventors: Bradley C. Litz, Chaska, MN (US); Craig R. Shankwitz, Minneapolis, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 10 days.

(21) Appl. No.: 14/883,279

(22) Filed: Oct. 14, 2015

(65) Prior Publication Data

US 2016/0154407 A1    Jun. 2, 2016

Related U.S. Application Data

(60) Provisional application No. 62/143,978, filed on Apr. 7, 2015, provisional application No. 62/063,952, filed on Oct. 15, 2014.

(51) Int. Cl.
| | |
|---|---|
| G05D 1/02 | (2006.01) |
| G08G 1/16 | (2006.01) |
| G01M 17/007 | (2006.01) |

(52) U.S. Cl.
CPC ........ G05D 1/021 (2013.01); G01M 17/0074 (2013.01); G01M 17/0078 (2013.01); G05D 1/0276 (2013.01); G05D 1/0289 (2013.01); G08G 1/166 (2013.01); G05D 2201/0213 (2013.01)

(58) Field of Classification Search
None
See application file for complete search history.

(56) References Cited

U.S. PATENT DOCUMENTS

| | | | | |
|---|---|---|---|---|
| 4,996,468 A | * | 2/1991 | Field | G01S 17/936 15/319 |
| 2011/0270467 A1 | * | 11/2011 | Steffan | G01M 17/0078 701/2 |

(Continued)

OTHER PUBLICATIONS

Frazzoli, et al., "Real-time motion planning for agile autonomous vehicles", "Journal of Guidance, Control, and Dynamics", Jan.-Feb. 2002, pp. 116-129, vol. 25, No. 1.*

(Continued)

Primary Examiner — Rami Khatib
(74) Attorney, Agent, or Firm — Steven M. Koehler; Westman, Champlin & Koehler, P.A.

(57) ABSTRACT

A system and method for testing a test vehicle or a system on the test vehicle for warning the presence of an object proximate the test vehicle or a system to avoid a collision includes a self-powered, independently movable target configured to be positioned proximate the test vehicle, the target comprising a support frame having wheels, a motor operably coupled to one or more wheels, brakes operably coupled to each wheel and a control system coupled to the motor, brakes and wheels and configured to control acceleration, braking and steering of the wheels, and a collision avoidance system operable with the control system and configured to control the target to avoid a collision with the test vehicle.

27 Claims, 14 Drawing Sheets

(56) References Cited

U.S. PATENT DOCUMENTS

2013/0018526 A1    1/2013  Kelly et al.
2014/0058589 A1*   2/2014  Kelly ........................ G06F 7/00
                                                      701/2
2014/0191565 A1*   7/2014  Gebeau .................. B60B 15/00
                                                      301/41.1

OTHER PUBLICATIONS

International Search Report for corresponding International application No. PCT/US2015/055544 dated Feb. 3, 2016, 5 pages.
Written Opinion for corresponding International application No. PCT/US2015/055544 dated Feb. 3, 2016, 7 pages.
Kelly, J. et al, "Development of a Guided Soft Target for Crash Avoidance Technology Evaluation," Sae International Journal of Passanger Cars—Mechanical Systems, Sae Inc., US, vol. 4, No. 1, Jun. 1, 2011, pp. 479-487.

\* cited by examiner

TEST METHOD AND SYSTEM USING A HIGHLY AGILE GROUND VEHICLE FOR INTELLIGENT VEHICLE TESTING

CROSS-REFERENCE TO RELATED APPLICATIONS

The present application claims the benefit of and priority to U.S. provisional patent application Ser. No. 62/063,952, filed Oct. 15, 2014, and 62/143,978, filed Apr. 7, 2015, the contents of which are hereby incorporated by reference in its entirety.

BACKGROUND

Present methods of testing active safety systems/collision avoidance systems for ground vehicles generally includes a target vehicle. The idea behind the balloon vehicle or a Strikeable Surrogate Vehicle ("SSV") is that if the vehicle under test fails to avoid a collision, the vehicle under test can strike either the balloon vehicle or the SSV and hopefully only incur at the most minimal damage to the vehicle under test.

Some significant drawbacks exist with balloon or SSV testing. First, the balloon is not a realistic facsimile for a vehicle either visually to a test driver in a test car or to a sensor such as a radar device since the material and general construction is quite unlike that of a vehicle. In many instances, the balloon or SSV is towed by another vehicle which introduces another vehicle into the test that may not be desired. In some cases, the balloon or SSV is not tethered to another vehicle, but is mounted to self-powered carriage. However, in either case, the dynamic capabilities of the balloon or SSV can limit the test that can be performed in that the balloon or SSV will deform, lift off or otherwise behave unlike a vehicle if moved too quickly. Since it is expected that the balloon or SSV will be struck, a risk of damage to the test vehicle always remains, and commonly, eventually after repeated collisions with the test vehicle(s), the balloon or SSV will need to be replaced.

SUMMARY

This Summary herein is provided to introduce a selection of concepts in a simplified form that are further described below in the Detailed Description. This Summary and Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A first aspect of the disclosure is an arrangement or system for testing a vehicle under test (hereinafter also referred to as a "test vehicle" or a system on the test vehicle for warning the presence of an object proximate the test vehicle or a system to avoid a collision. The system includes a self-powered, independently movable target configured to be positioned proximate the test vehicle. The target includes a support frame with wheels, a motor operably coupled to at least one wheel, brakes operably coupled to each wheel and a control system coupled to the motor, brakes and wheels and configured to control acceleration, braking and steering of the wheels. A collision avoidance system is operable with the control system and configured to control the target to avoid a collision with the test vehicle.

The system can have one or more of the following features. For instance, the target can include a fan configured to create a vacuum under the target. Preferably, a cavity is formed in a panel under the target and fluidly coupled to the fan.

A first wireless communication device apart from any system under test can be mounted on the test vehicle. The target can include a second wireless communication device in communication with the first wireless communication device and which is operably coupled to the collision avoidance system. The collision avoidance system is configured to control the target based on information received from the second wireless device.

To improve performance over that of the test vehicle the control system is configured to selectively provide more torque to one wheel over another wheel. Although the target can take numerous forms to represent various objects in the environment, the target typically comprises a vehicle. If desired, driver operated controls can steer, brake and/or control the motor of the target.

In as further embodiment, the arrangement can include a plurality of self-powered, independently movable targets configured to be positioned proximate the test vehicle, each target comprising a support frame having wheels, a motor operably coupled to the wheels, brakes operably coupled to each wheel and a control system coupled to the motor, brakes and wheels and configured to control acceleration, braking and steering of the wheels, and a collision avoidance system operable with the control system and configured to control the target to avoid a collision with the test vehicle.

In a particularly advantageous embodiment, the target has one or more performance characteristics of longitudinal acceleration and/or lateral acceleration substantially better than the test vehicle. Herein substantially better longitudinal acceleration is at least 25% better than the test vehicle. In a further preferred embodiment, longitudinal acceleration is at least 50% better than the test vehicle. In yet a further preferred embodiment, longitudinal acceleration is at least 75% better than the test vehicle. Whereas, herein substantially better lateral acceleration is at least 50% better than the test vehicle. In a further preferred embodiment, lateral acceleration is at least 100% better than the test vehicle. In yet a further preferred embodiment, lateral acceleration is at least 150% better than the test vehicle. For instance, the target can have a more powerful motor or engine allowing the target to accelerate (in one embodiment, 1 g+ acceleration) when needed and/or have improved deceleration through the use of active ground effects, which allow the target to stop faster and/or for steering.

A second aspect of the disclosure is a method for testing a test vehicle or a system on the test vehicle for warning the presence of an object proximate the test vehicle or a system to avoid a collision, the method includes maneuvering a test vehicle in a test situation proximate a target, the target having one or more performance characteristics substantially better than that of the test vehicle; monitoring for a likelihood of a collision between the test vehicle and the target; and maneuvering the target to avoid the collision in the event the likelihood of a collision when the likelihood of a collision exceeds a pre-determined threshold. If desired, the method can include a plurality of targets, each target being maneuvered during the test, each target having one or more performance characteristics substantially better than that of the test vehicle. One or more of the above described features described above in the arrangement can be included in the method.

A third aspect of the disclosure is a wheeled apparatus comprising a support frame with wheels, a motor operably coupled to one or more wheels and brakes operably coupled to each wheel. A control system is coupled to the motor, brakes and the wheels and configured to autonomously control acceleration, braking and steering of the wheels. A collision avoidance system is operable with the control system and configured to avoid a collision with a test vehicle. A ground effect system is configured to create a vacuum between a downwardly facing panel on the carriage and a surface upon which the apparatus travels. In one embodiment, the ground effect system includes a fan. Typically, a cavity is fluidly coupled to the fan and/or skirts are provided to enhance the vacuum.

DETAILED DESCRIPTION OF THE ILLUSTRATIVE EMBODIMENTS

A broad aspect of the disclosure includes a system allowing a test vehicle having a collision avoidance system or other active vehicle control system to be tested in a manner that can accurately simulate realife conditions without risk of damage to the test vehicle or other components of this system by avoiding collisions of the test vehicle with one or more targets involved in the test. Besides avoiding collisions, the system also can repeat the test consistently allowing for accurate comparisions if needed between individual tests to assess performance of the test vehicle and/or the collision avoidance system or other active vehicle control system for different operating parameters and/or components.

Figure 1:
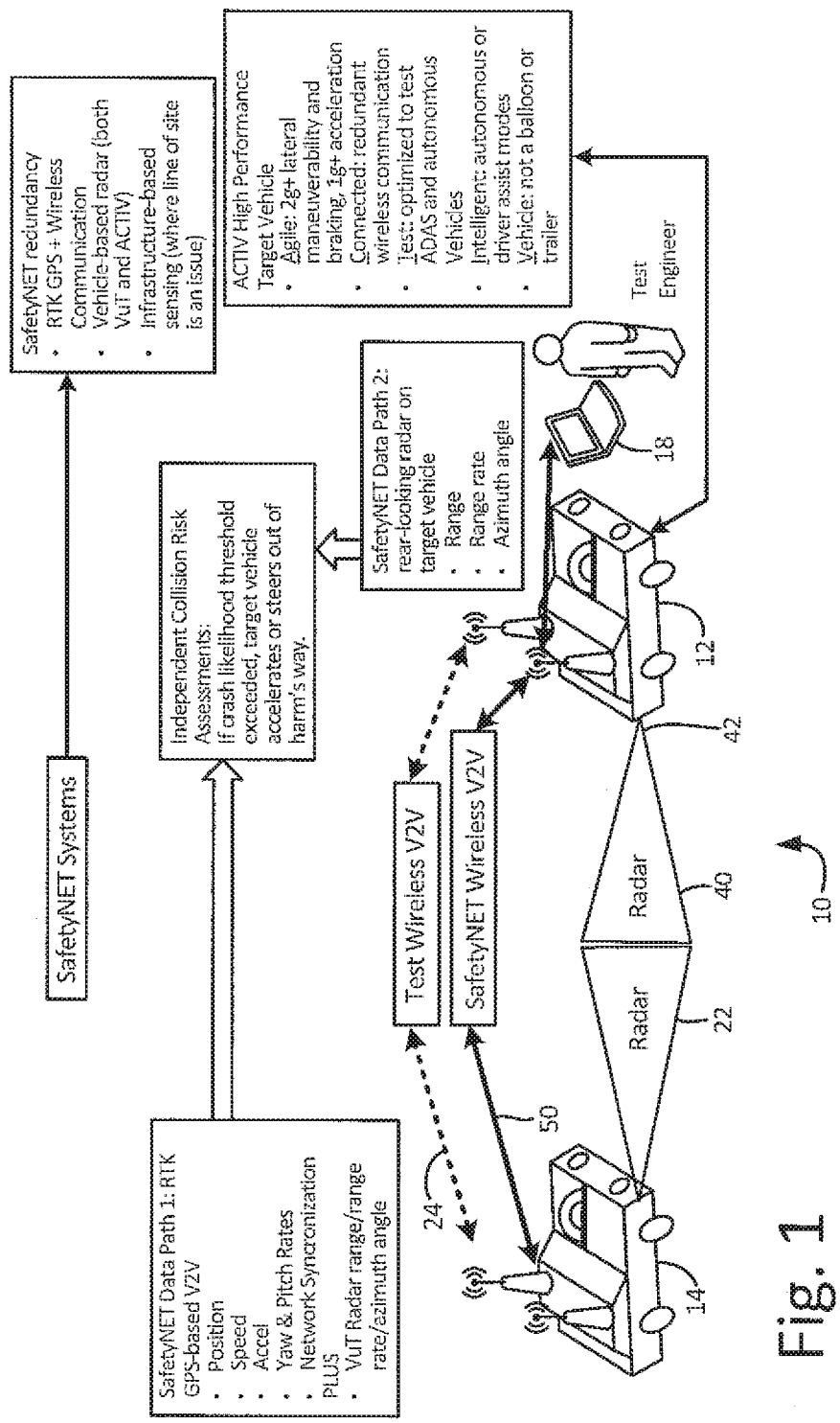
FIG. 1 is a schematic illustration of a system using a highly agile vehicle.

Referring to FIG. 1, system 10 by way of example includes an agile target 12, (which herein can be but is not limited to a facsimile of a vehicle without the ability to carry a person, or an actual vehicle, or can be a facsimile of other objects commonly found on roads such as pedestrians, bicyclists, etc.) a test vehicle 14 and a wireless communication network 16 with sensor(s) or other parameter generating device(s) such that the target 12 can take appropriate action to avoid a collision with the test vehicle 14 when a collision would otherwise take place or the risk of a collision occurring reaches a selected threshold or other measure.

Figure 2:
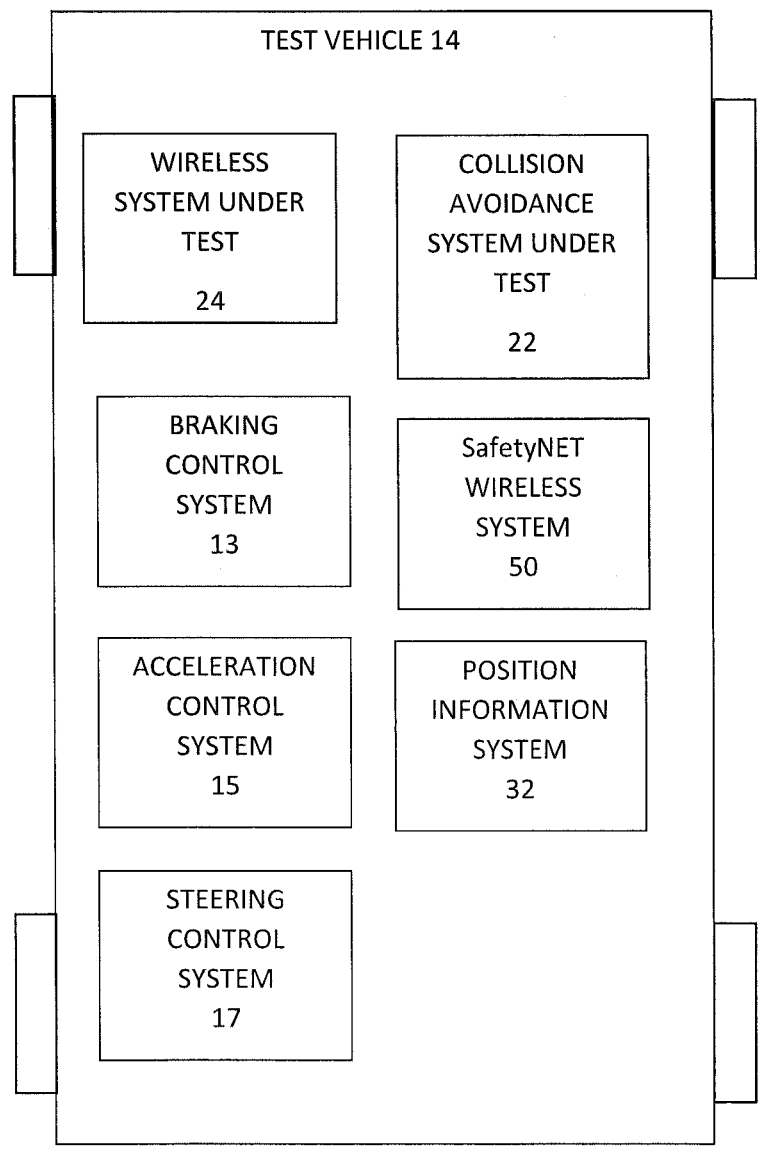
FIG. 2 is a schematic illustration of a test vehicle.

Referring first to the test vehicle 14 (FIG. 2), the test vehicle 14 can comprise a conventional driver operated vehicle having one or more systems to avoid a collision with another vehicle or object, herein exemplified as a collision avoidance system 22 having a forward looking radar device and/or a system using vehicle to vehicle "V2V" communication network 24 under test. It should be understood that aspects of the disclosure are not limited to active collision avoidance systems that actively control at least a portion of the vehicle, but can also be used for passive collision avoidance systems that do not control the vehicle but rather provide the driver a warning such as lane departure systems that warn the driver when the vehicle has departed its lane and/or systems that warn the driver of vehicles or objects to the side or rear of the test vehicle using for example radar devices oriented in other directions with or without information obtained from forward looking radar device 22.

Figure 2A:
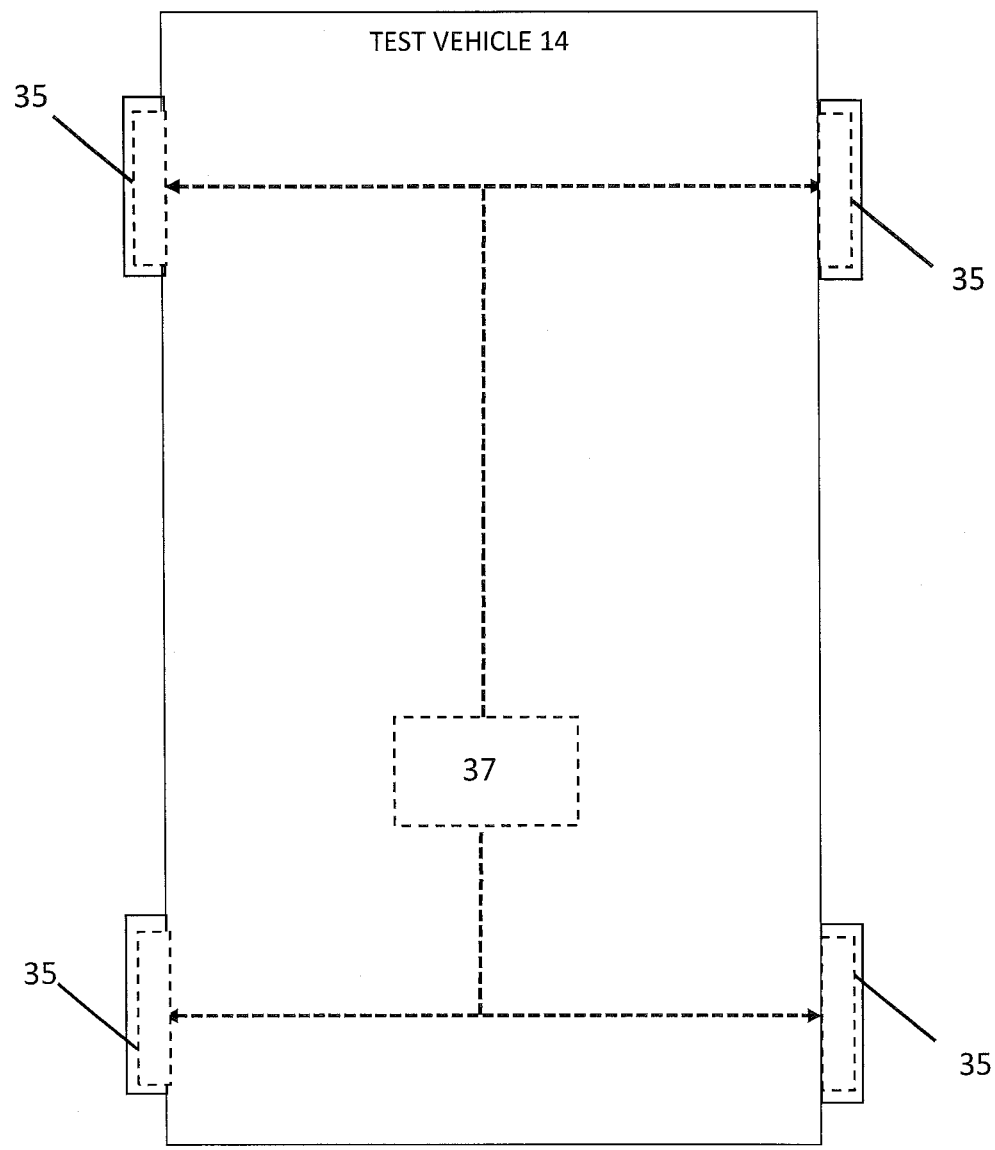
FIG. 2A is a schematic illustration of a drive system for a test vehicle.

Aspects of the disclosure can also be used with fully autonomous, driverless vehicles or to test systems providing information for such vehicles to operate but not actually operating the vehicle. In other embodiments, test vehicle 14 may be a conventional driver operated vehicle with no control systems otherwise present to control any aspect of the vehicle such as braking, acceleration or steering, or may be a conventional driver operated vehicle with one or more systems to control aspects of the vehicle that the driver would typically control such as braking (braking control system 13 operably coupled to the brakes 35 in FIG. 2A), acceleration (acceleration control system 15 operably coupled to one or more motors 37 in FIG. 2A) or steering (steering control system 17), when desired. (It should be noted herein the braking control system 13, acceleration control system 15 and steering control system 17 are illustrated separately in FIG. 2 for purposes of understanding. These systems and other systems may be combined together in a single control system or in any manner desired in the test vehicle 14.) For example, in one embodiment a driver may be present to control the test vehicle 14 to place the test vehicle 14 in an operating state suitable for conducting a test such as controlling the test vehicle 14 so as to place the test vehicle 14 behind the target 12 at some approximate range. Then, one or more of the systems on the test vehicle 14 can take over one or more aspects of controlling the test vehicle 14 to finalize the desired position or configuration of the test vehicle 14 for the test to be conducted.

Figure 3:
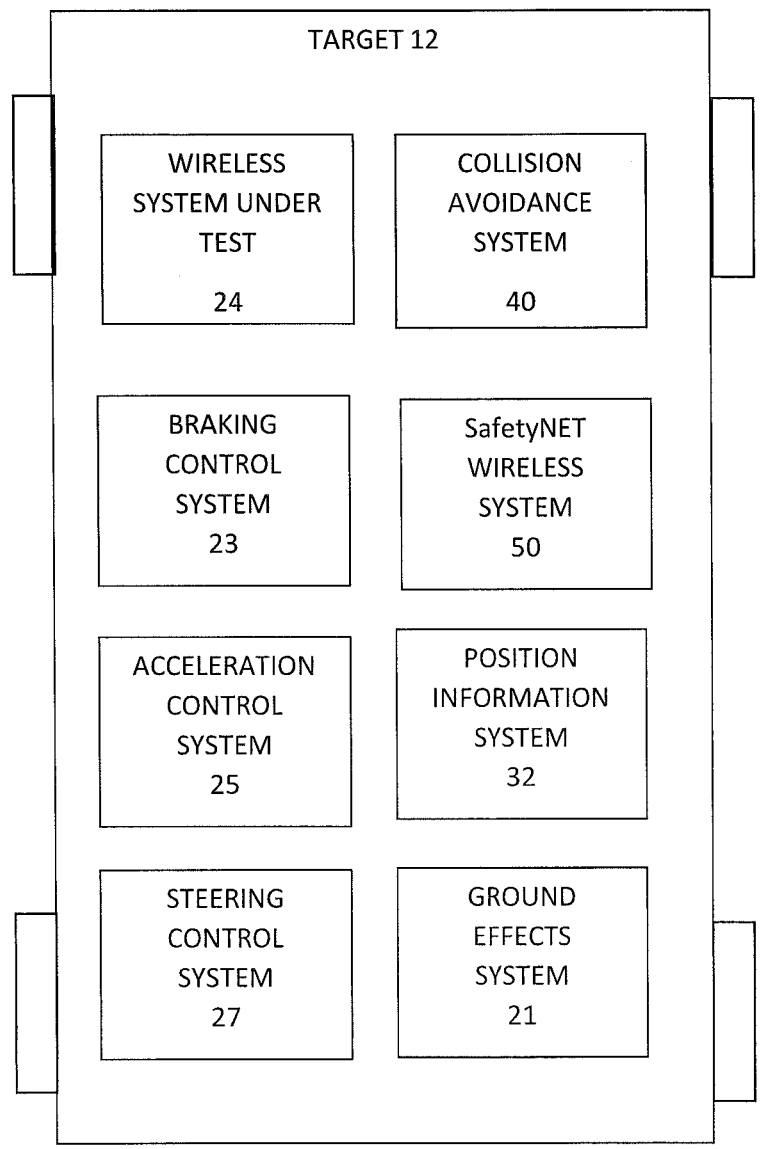
FIG. 3 is a schematic illustration of a target.
Figure 3A:
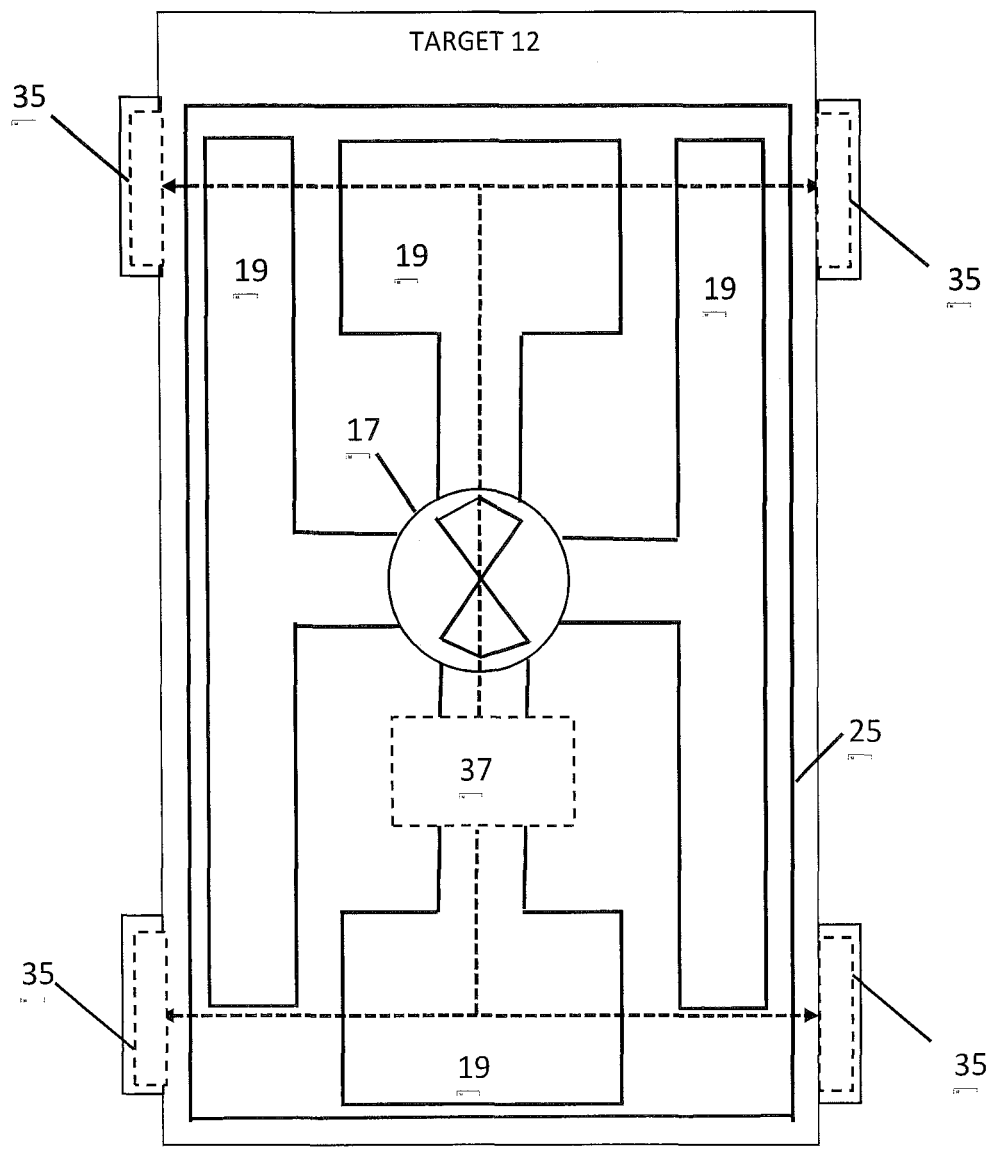
FIG. 3A is a schematic illustration of ground effects for a target.

Referring next to the agile target 12 in FIG. 3, this component of the system 10 has one or more performance characteristics and/or systems that allow the target 12 to take action(s) to avoid a collision with the test vehicle 14. Some characteristics of the target 12, which should not be considered limiting nor should be considered required characteristics of all targets, include that the target 12 is more agile than that of the test vehicle 14 thereby allowing the target 12 to move out of the way of the test vehicle 14 when it is apparent that the target 12 will be struck by the test vehicle 14, or the risk of being struck has reached one or more selected thresholds. In a particularly advantageous embodiment, the target 12 has one or more performance characteristics of longitudinal acceleration and/or lateral acceleration substantially better than the test vehicle. Herein substantially better longitudinal acceleration is at least 25% better than the test vehicle. In a further preferred embodiment, longitudinal acceleration is at least 50% better than the test vehicle. In yet a further preferred embodiment, longitudinal acceleration is at least 75% better than the test vehicle. Whereas, herein substantially better lateral acceleration is at least 50% better than the test vehicle. In a further preferred embodiment, lateral acceleration is at least 100% better than the test vehicle. In yet a further preferred embodiment, lateral acceleration is at least 150% better than the test vehicle. For instance, the agile target 12 can have a more powerful motor or engine 37 (schematically illustrated in FIG. 3A) allowing the agile target 12 to accelerate (in one embodiment, 1 g+ acceleration) when needed and/or have improved deceleration through the use of active ground effects, which allow the target 12 to stop faster and/or for steering (as discussed below).

However, at this point it should be noted that the target 12 can include the use of a balloon, or other crash structure, or is an SSV and still be an agile vehicle capable of avoiding collisions with the test vehicle 14, if desired. In this manner, the user can decide that the target 12 can be struck by the test vehicle 14, or that no collision should occur.

As another aspect of the disclosure, it is advantageous that the agile target 12 have improved lateral maneuverabiltiy, for example, 2 g+ lateral maneuverability. For example, the agile target 12 can have active ground effects 21, which can include by way of example a fan 17 (schematically illustrated in FIG. 3A) mounted on the carriage or support frame of the vehicle 12 that creates a partial vacuum beneath the vehicle 12 with the road surface preferably in one or more cavities or recesses 19 provided on the underside panel(s) of the vehicle. By creating a partial vacuum below the vehicle 12, the normal force that the tires of the vehicle impart on the road surface can be substantially increased. Because the maximum friction force of the tire on the road is proportional to the normal force exerted by tire on the road, increasing the normal force increases the maximum tangential force that the tire can exert on the road before the tire slips/breaks traction. By increasing the maximum tangential force on the tire without increasing the mass of the vehicle, the target 12 becomes more maneuverable. If the tire normal force is doubled, the force it takes for the tire to break traction doubles. By doubling the maximum force the tire can generate with the same mass of vehicle, the lateral acceleration which can be generated by that vehicle doubles. Likewise, the braking capability of the vehicle 12 also doubles because it takes twice the tangential force to break traction. With respect to acceleration, increasing the tangential force limit allows the agile target 12 to accelerate at higher levels without spinning the tires. The addition of downforce without changing vehicle mass greatly increases the dynamic capability of the target 12. If desired, the ground effects system 21 of the target 12 can include underside panels to create a flat or flatter surface facing the road surface and/or skirt(s) 25 mounted along the front, rear or side portions of the vehicle 12 to create a cavity or recess through which a vacuum can be drawn from the fan or blower if desired.

Figure 4:
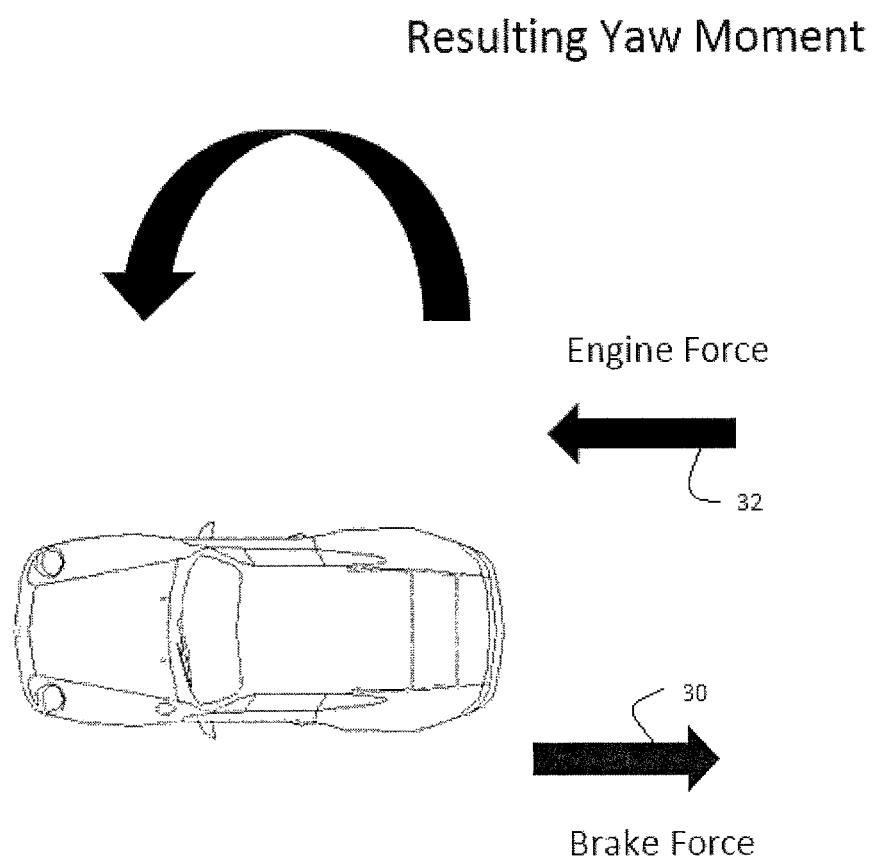
FIG. 4 is a pictorial representation of forces and a yaw moment on a vehicle.

If desired, the agile target 12 can include thrust vectoring capabilities so as to increase the rate at which the agile target 12 can yaw. FIG. 4 illustrates thrust vectoring. The agile target 12 can be equipped with differential brake capabilities from a braking control system 23 along the vehicle longitudinal axis. For example, if the target 12 needs to move to the left quickly to avoid a collision, left-side brakes, are applied, creating a deceleration indicated by the arrow 30 pointing in the direction away from the rear of the vehicle 12. At the same time, power can be applied to the rear differential through the acceleration control system 25. The torque applied to the right rear tire is greater than that applied to the left rear tire by virtue of the differential braking. The additional torque applied by the right rear tire is represented by the arrow 32 pointing toward the front of the vehicle. The coupling of these two forces applies a yaw moment to the agile target 12, accelerating the vehicle 12 about the yaw axis. This yaw moment adds to the yaw moment imparted by the front tires through the steering control system 27, thereby increasing its agility compared to vehicles without the benefit of thrust vectoring. The vehicle 12 can be a rear wheel drive vehicle, although in another embodiment, an all-wheel drive vehicle may have yet better performance characteristics.

In another embodiment, the vehicle 12 can include one or more electric motors 37 that drive the wheels collectively through a suitable gearbox or individually on opposite sides or at all corners of the vehicle. In this manner, power can be selectively provided to the wheel(s) on each side, or each corner, of the vehicle to effectuate thrust vectoring similar to that described above. In one embodiment, the vehicle can be an electric vehicle with rear wheels, or all wheels, driven individually by electric motors. An electric vehicle can be constructed so as to have a high power to weight ratio, which by itself would yield a highly agile vehicle. If also equipped with the ground effects system 21 such as the fan 17, one or more cavities 19 and/or one or more side skirts 25 to create a vacuum as described above, the electric vehicle can have performance characteristics exceeding those of a similarly equipped internal combustion engine.

The highly agile vehicle 12 can produce lateral, longitudinal, and/or rotational (in the yaw axis) acceleration capabilities far beyond those offered by standard road-going vehicles. By virtue of these high acceleration capabilities, the highly agile vehicle 12 can move away from a collision "at the last second," providing a realistic test environment whereby tests can be executed close to a collision, but without a collision.

The agile target 12 can be a fully autonomous, driverless vehicle, or may be a conventional driver, operated vehicle with one or more of the systems mentioned above to control aspects of the vehicle that the driver would typically control such as braking, acceleration or steering, when desired. For example, in one embodiment a driver may be present to control the target to place the target 12 in an operating state suitable for conducting a test such as controlling the target 12 so as to place the target 12 in front of the test vehicle 14 at some approximate range whereafter one or more of the systems on the target 12 than take over one or more aspects of controlling the target 12 to finalize the desired position or configuration of the target 12 as well as conduct the test such as but not limited to slowing down or rapid braking in front of the test vehicle 14. In another test, the driver could be steering the target 12, while the braking control system 23 and acceleration control system 25 of the target otherwise controls the speed of the target 12.

The target 12 can be equipped with one or more sensors operably coupled to one or more collision avoidance systems to detect a collision with another object such as the test vehicle 14, another target 12, and/or a stationary or moving object. In the schematic illustration of FIG. 1 this is represented by object detection system 40 comprising a proximity sensor system such as but not limited to a radar, lidar or ultrasound system. Although illustrated with a rearward looking sensor 42, it should be understood that additional sensors can be present on target 12 oriented in other directions from the target 12. Such system(s) can measure range, range rate and azimuth angle of object(s) in the sensed region. Based on the presence of the test vehicle 14 or other objects detected by these systems, the collision avoidance system 40 on the target 12, or at another location, can provide control instructions to systems 23, 25 and 27 controlling braking, acceleration, and/or steering, respectively, of the target 12 so as to direct the target 12 to take one or more actions to avoid a collision.

The target 12 can also be equipped with a second wireless communication system (herein also identified as "SafetyNET Wireless") 50 allowing communication of the one or more systems of the target 12 with the test vehicle 14, other test vehicle(s), other target(s) 12, stationary sensor(s) and/or a remote command or monitoring system 18. Referring first to communication with the test vehicle 14, the wireless communication system 50 of the target 12 can obtain position information of the test vehicle 14 based on a position information system 32, for example, based on global positioning system (GPS) or a realtime (RTK GPS) provided on the test vehicle 14. It should be noted that this wireless communication of position information can be separate from a wireless communication system under test 24 and thereby is redundant with the wireless communication system under test 24.

Other information that can be transmitted from the test vehicle 14 to the target(s) 12 and/or the remote command and/or monitoring system 18 include information from other redundant proximity sensors mounted to the test vehicle 14 in addition to any proximity sensor under test. Also, if desired, other positional information pertaining to the test vehicle such as its current position, velocity, acceleration and/or rate of change with respect to yaw, pitch and/or roll, for example, as measured by measured by GPS, velocity sensors, accelerometers, and angular rate sensors, respectively of the positional information system 32 can also be transmitted.

Other, non-positional information of the test vehicle 14 can also be transmitted to the target(s) 12 and/or the remote command and/or monitoring system. Such information can include output(s) of the systems under test on the test vehicle 14 and/or indications or measurements pertaining to operation of braking, steering, etc. systems of the test vehicle 14. Using any or all of the foregoing information, collision avoidance system(s) 22 on the target 12 or at the remote command and/or monitoring system 18 can assess a measure of likelihood that a collision will take place with the target 12 and command system(s) on the target 12 such as braking, acceleraion and/or steering control systems 23, 25, 27 to take one or more actions to avoid the collision. Generally, the measure of likelihood of a collision involves an assessment of position and trajectory of the test vehicle 14 with respect to position and trajectory of other test vehicle(s), if present, and/or position and trajectory of the target(s) 12 in the test. Assessment of likelihood of a collision can be ascertained by the remote monitoring and command system 18 and/or via onboard systems 40 on any or all of the target(s) 12 in the test, particularly if said any or all of the target(s) 12 are provided with positional, trajectory and/or operational state information of test vehicle(s) 14 and target(s) 12 in the test.

By way of example and not limitation, FIG. 1 can represent the testing of a forward collision warning system, i.e., a dynamic brake support system (where the vehicle brake system brake augments the brake force applied by the driver if the driver isn't braking sufficiently hard), or a collision imminent braking system (which applies the brakes if the driver does not). The test vehicle 14 determines the range, range rate, and azimuth of the target 12 through a vehicle-based sensor (radar or lidar, typically) and/or vehicle-to-vehicle (V2V) communications 24 where relative speed and location are determined from GPS measurements.

Through position information system 32 and/or wireless communication network 50, separate from the system under test, the highly agile vehicle 12 determines its relative speed and location with respect to the test vehicle 14.

The highly agile vehicle 12 uses its relative position and speed information from its own sensors and wireless communication network as well as the test protocol being executed to position itself in the proper state required for test execution. For the forward collision warning example, the "proper state" consists of the proper vehicle separation, relative speed, and acceleration differential between the test vehicle 14 and the target 12.

When the "proper state" is achieved, the highly agile vehicle 12 initiates a braking or otherwise a slowing down test event.

During the test event, the highly agile vehicle 12 and/or a remote monitoring station 18 monitors the range, range rate, relative acceleration, and time to collision of all vehicles involved in the test. Using this information, a remote and/or an on-board computer continuously calculates a crash likelihood measure. If the crash likelihood measure reaches a pre-set threshold, a crash is considered likely if the test continues. When this threshold is reached, the highly agile vehicle 12 or the remote monitoring station 18 broadcasts a "test abort" message to the other targets 12, and executes a soft abort, maneuvering out of the path of the test vehicle 14 and other targets 12, preventing a crash. It should be noted any of the targets 12 can continuously monitor for the possibility of a collision with the any car involved in the test.

Generally, the performance characteristics of each target 12 can be tested or otherwise ascertained for various actions to avoid the collision. These performance characteristics can be used by the collision avoidance system 40 and/or the remote monitoring station 18. Depending on the test and the role played by each target 12 in the test, the measure used for monitoring for a collision for each target 12 may be different. Given the high degree of agility of the target 12, the crash state can be approached more closely than when compared to two vehicles of similar dynamic capability.

Figure 5A:
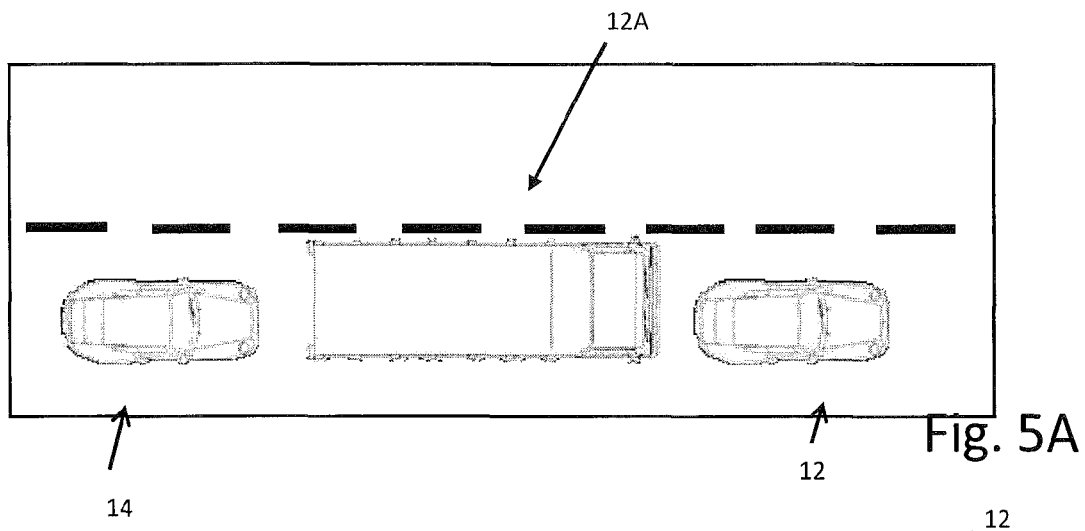
FIGS. 5A-5C illustrate exemplary test scenarios.
Figure 5B:
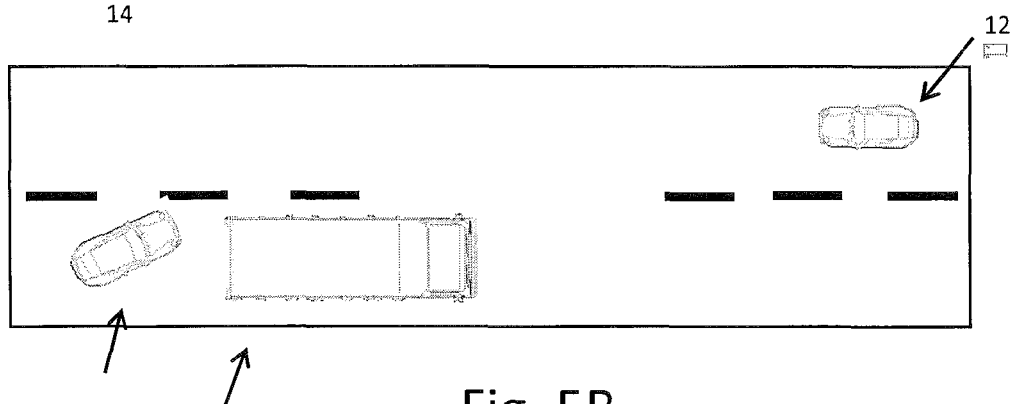
Figure 5C:
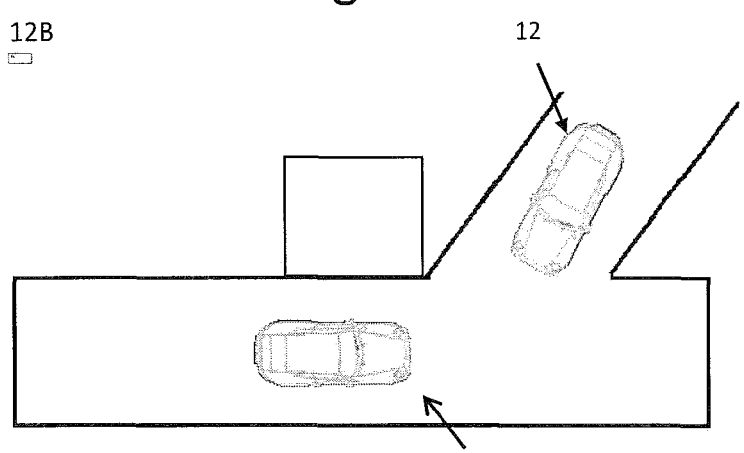

The foregoing and FIG. 1 is illustrative of a single dimension test, and in particular, where the test vehicle 14 and the target 12 are traveling in the same direction. FIGS. 5A-5C illustrate tests involving additional targets. FIG. 5A illustrates a one dimensional test where an additional target 12A is also traveling (or stopped) in the same lane. In this test, the target 12 comprising the car is traveling in the same direction as the test vehicle 14, but ahead of the test vehicle 14. In between the target and the test vehicle 14 is another target 12A, herein comprising a truck also traveling in the same direction as the test vehicle 14. The test comprises the target car 12 slowing down or traveling at a rate slower than the test vehicle 14 and the target truck 12A. In view that the target truck 12A is interposed between the test vehicle 14 and the target car 12, a collision between the test vehicle 14 and the target truck 12A is possible. The test involves coordinating three vehicle trajectories without line of sight. During the test, the collision avoidance system 22 and/or wireless system 24 can generate a brake warning indicator for the driver and/or activate braking of the vehicle.

FIG. 5B illustrates a form of a two-dimensional test also involving two targets 12, 12B. In this test, the collision avoidance system 22 of the test vehicle 14 must ascertain if steering to avoid a rear end collision with target 12, herein a bus traveling in the same direction at a slower rate by changing lanes is possible given the oncoming target 12B in the other lane. Like the test of FIG. 5A, the test of FIG. 5B involves coordinating three vehicle trajectories without line of sight. In one embodiment, the test can involve detecting the target 12 not yet in a blind spot created by the target bus, or in another embodiment, where the target bus 12B creates a blind spot. During the test, the collision avoidance system 22 and/or wireless system 24 can generate a do not pass warning indicator for the driver.

Figure 6:
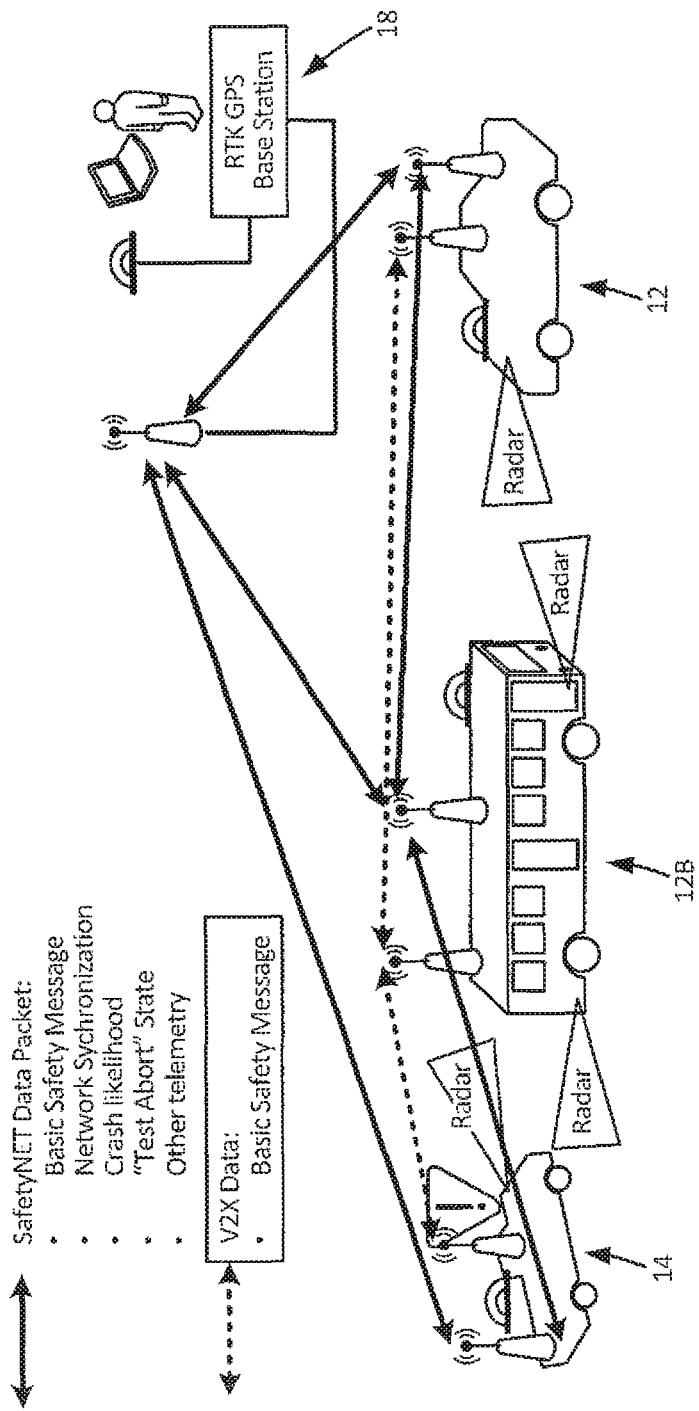
FIG. 6 is a schematic illustration of the system for the test scenario of FIG. 5B.

FIG. 6 schematically illustrates interaction of the test vehicle 14 and targets 12, 12B in the test of FIG. 5B. The test vehicle 14 includes the systems of FIG. 2 where wireless communication (dash lines) is provided between the test vehicle 14 and each of the targets 12, 12B. Each of the targets 12, 12B include the systems of FIG. 3. The collision avoidance systems 40 in each target 12, 12B can maintain a "test abort" state, i.e. whether to abort the test or not, as well as test abort trajectory, which can be established prior to the test, for example steer in a preselected direction and stop, which can be varied during execution if needed from other inputs (e.g. radar) from the collision avoidance system 40 and/or from the SafetyNet wireless system 50, communication of which can be from the test vehicle 14, the other target 12, 12B or the remote monitoring station 18.

FIG. 5C also can comprise a two dimensional test where the target 12 is approaching in an intersecting trajectory with the test vehicle 14 (herein on a blind intersection). In one embodiment of this test, the target 12 will not stop but rather turn in front of the test vehicle 14 at which point the the collision avoidance system 22 with possible input from the wireless system 24 of the test vehicle 14 must ascertain which of steering and/or braking, or a combination of the two, is necessary to avoid the collision.

Figure 7:
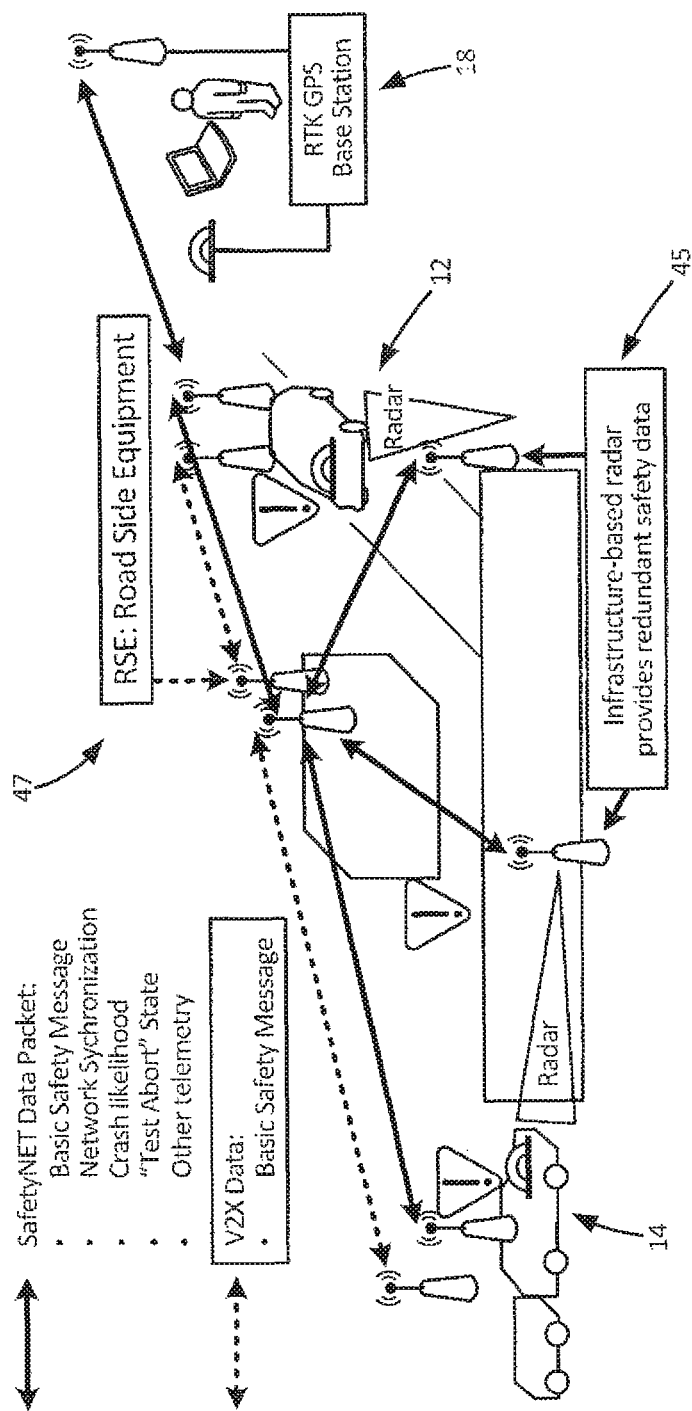
FIG. 7 is a schematic illustration of the system for the test scenario of FIG. 5B.

FIG. 7 schematically illustrates interaction of the test vehicle 14 and target 12 in the test of FIG. 5C. The test vehicle 14 and target 12 are similar to those described in FIG. 6. Note however additional radar or other forms of proximity sensors 45 can be included to provide additional information for the SafetyNet system 50. If desired, the wireless system under test 24 can include road side equipment 47.

Figure 8:
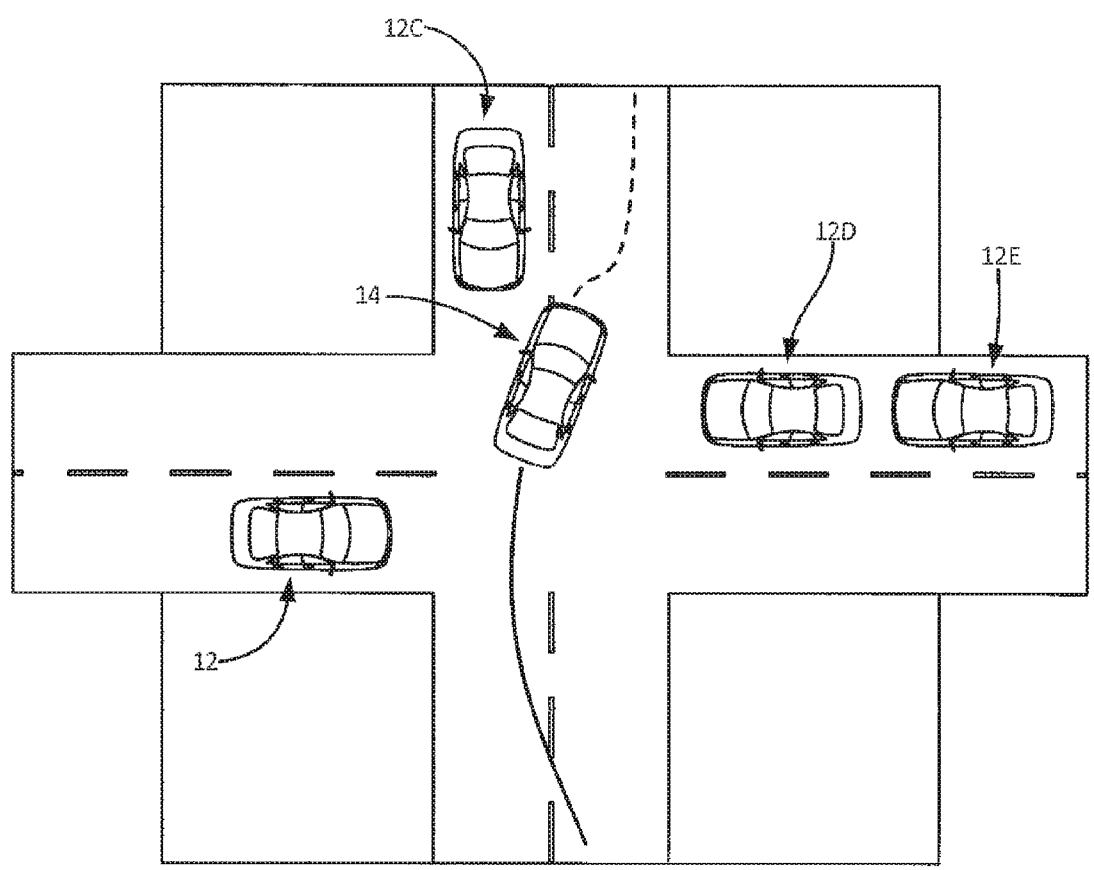
FIGS. 8-9 illustrate exemplary test scenarios.

FIG. 8 also depicts a test involving an intersection with approaching target cars 12, 12C, 12D, 12E from one or both directions perpendicular to travel of the test vehicle 14. Again, this test can be constructed so as to be two-dimensional in that the test vehicle 14 to avoid collisions with any of the targets 12, 12C, 12D, 12E must execute steering with or without braking (possibly even acceleration) to avoid all collisions.

Figure 9:
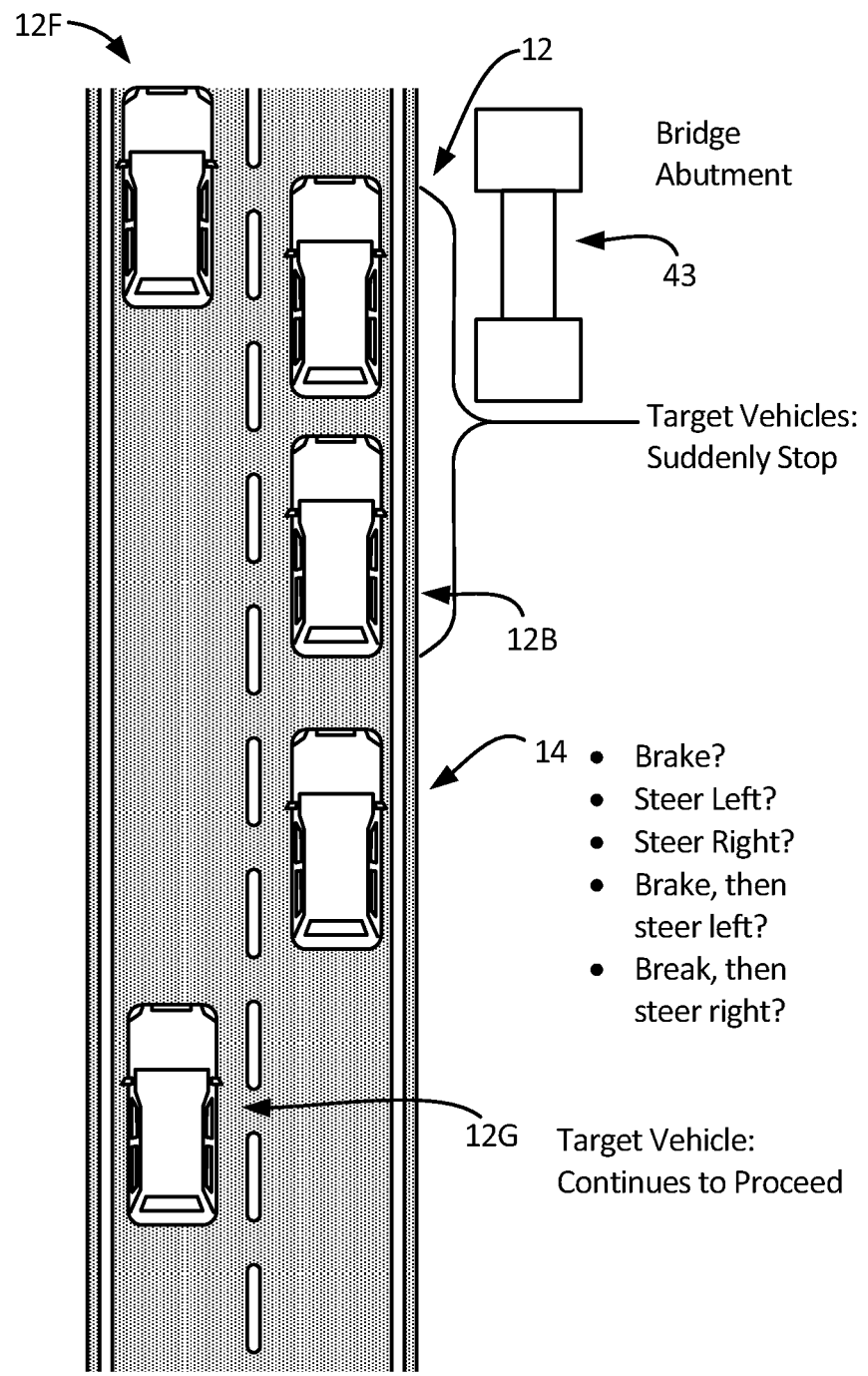

Another test having an additional target is illustrated in FIG. 9. In this test, the test vehicle 14 again is following two targets 12, 12B in the same lane as the test vehicle 14, where the two targets 12, 12B can present the same test scenario as that of FIG. 5A where one or both targets 12, 12B will rapidly slow down in front of the test vehicle 14. However, in FIG. 7, another target 12G traveling in the same direction as that of the test vehicle 14 is approaching the test vehicle 14 from behind in the adjacent lane. This test represents how multiple targets can be used to present a test scenario that can operates in two dimensions rather than in the one dimension where the test vehicle 14, where the latter merely must avoid the collision by stopping in time.

In FIG. 9, the test scenario can be constructed such that the test vehicle 14 would not be able to stop in time by maintaining its current lane. Instead, the test vehicle 14 would need to ascertain if it is better to steer and change lanes (given the approaching target 12G from behind) to avoid the collision, or possibly to brake until the target 12G from behind passes the test vehicle 14 whereupon the test vehicle 14 can then change lanes (with or without releasing the brakes).

In yet another variant of this test, the test scenario could be constructed such that braking will not avoid the collision with the targets 12, 12B slowing down in front of the test vehicle 14, and that the position and/or rate of travel of the target 12G approaching from the rear blocks the test vehicle 14 from changing lanes, in which case, the only viable solution to avoid any collision is to run off the road on the right side and stay on the shoulder to avoid the bridge abutment 43.

Although described above where the target 12 is a four-wheel vehicle, this should not be considered limiting. The vehicle can have fewer than four wheels such as a motorcycle (two wheel or three wheel). In another embodiment, the target can comprise a non-motorized vehicle, moving object such as bicycle (such as an electrically powered bicycle), or other motorized apparatus in the form or facsimile of a pedestrian, animal etc. that can be on roads. Like the target 12 discussed above, each of these other non-motorized vehicle objects is independently movable throughout a test area being self-powered and autonomous so as to enable each target to travel to its respective position to begin a test sequence, be in motion and synchronize its motion with the test vehicle(s) and/or other targets so as to conduct the test and during the test. Like the target 12 discussed above, each of the non-motorized vehicle targets can include on-board proximity sensors and/or wireless communication systems that allow each of the targets to transmit its location and receive information as discussed above from test vehicle(s) and other target(s), if present. Based on commands received from a remote control and monitoring system, and/or based on assessments made by an on-board collision avoidance system, each target can be controlled with respect to acceleration, braking and/or steering so as to avoid a collision with the test vehicle(s). Like the target 12 discussed above, the non-motorized vehicle targets can have performance characteristics exceeding the performance characteristics of the test vehicle(s) and/or performance characteristics exceeding the common performance characteristics that each represents. As with the target 12 discussed above, high performance motors (for example, electric) can be used with ground effects and differential braking to improve performance. As such, the non-motorized vehicle objects can be mounted upon a carriage having multiple wheels if desired.

Figure 10:
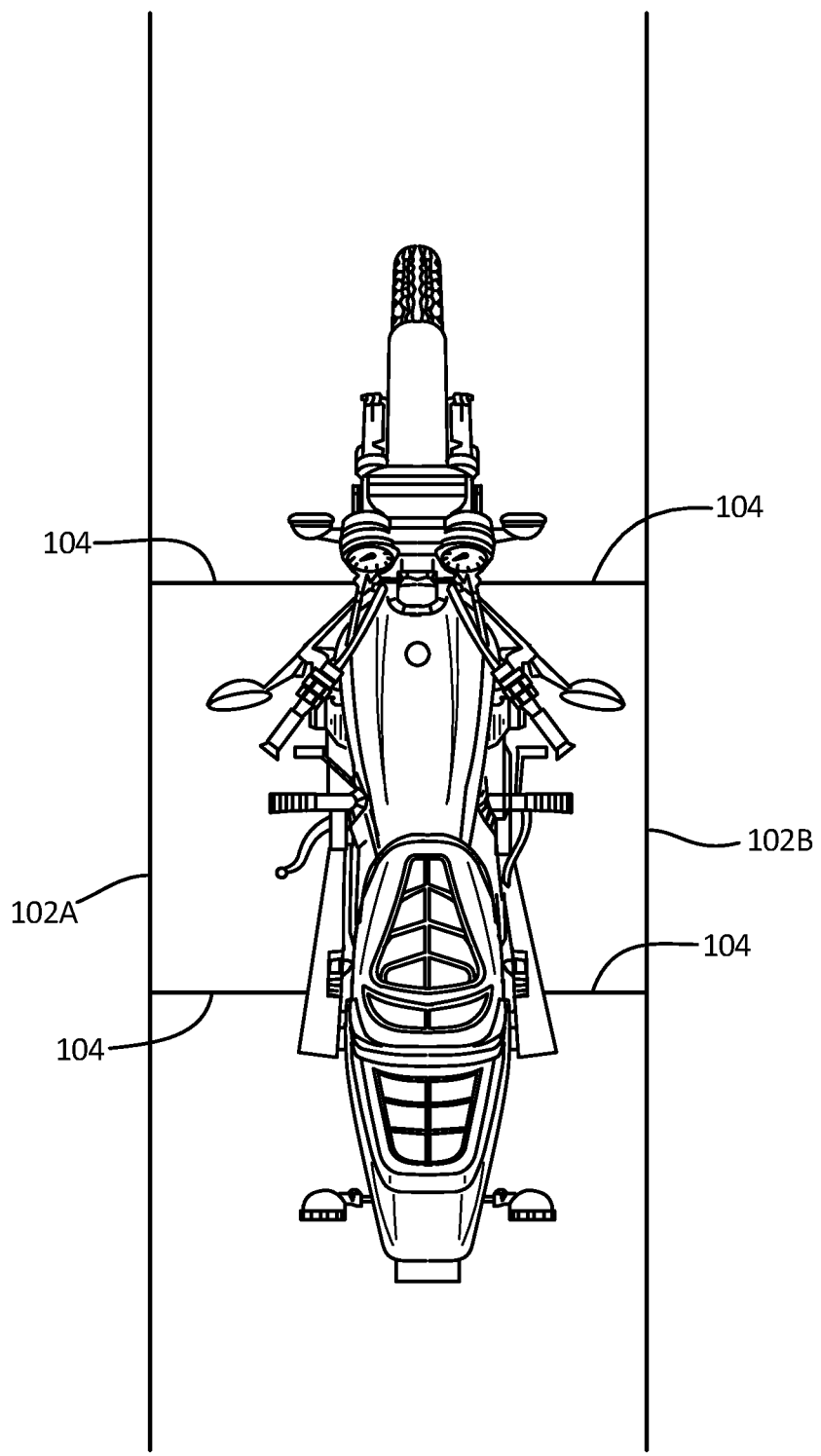
FIG. 10 is a top plan view of a first exemplary target.
Figure 11:
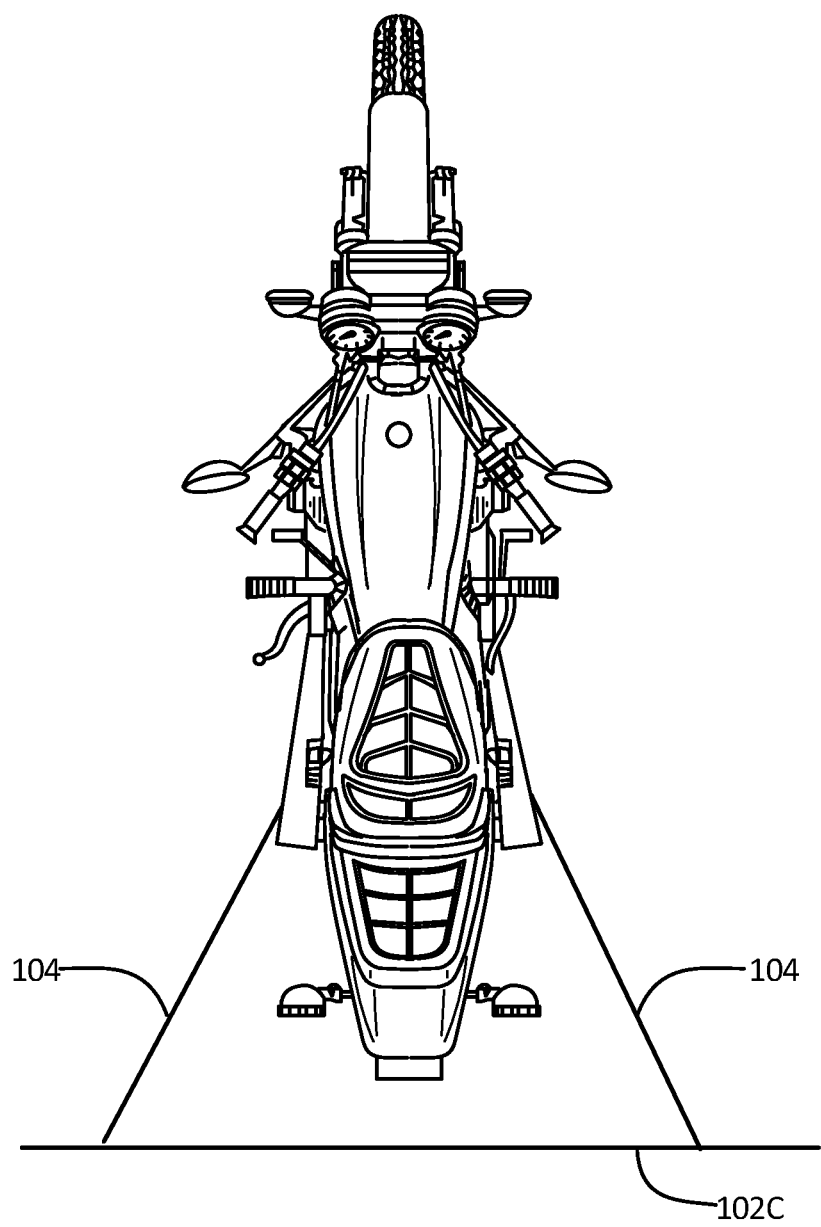
FIG. 11 is a top plan view of a second exemplary target.
Figure 12:
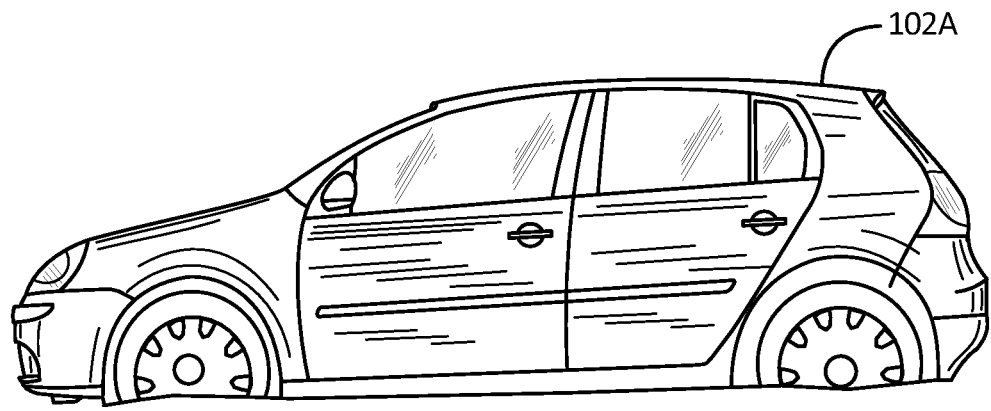
FIGS. 12 and 13 illustrate panels mountable to the target.
Figure 13:
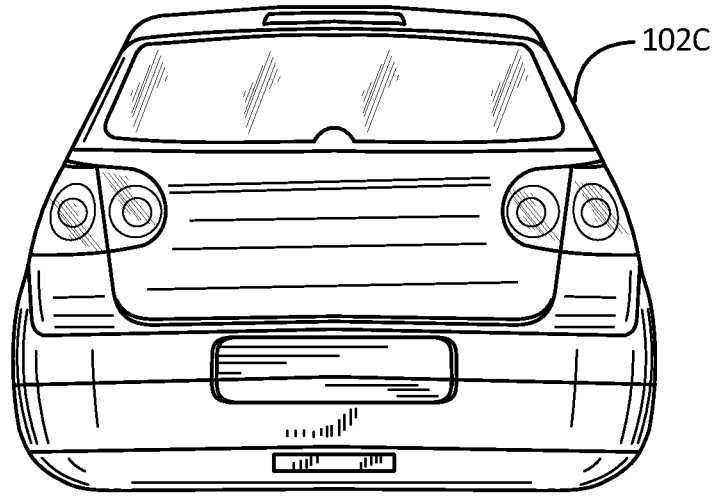

In a further embodiment, the vehicle can support panels or other body coverings that replicate another type of vehicle or non-motorized vehicle as seen by sensor(s) on the test vehicle 14 and/or other aspects of the collision avoidance systems under test. FIGS. 10 and 11 illustrate a motorcycle 100 supporting one or more panels 102A, 102B and 102C with supports 104 as necessary. Panel 102A is illustrated in FIG. 12 (panel 102B being a mirror image of panel 102A, but also could be different than panel 102A if desired. Panel 102C is illustrated in FIG. 13. It should be understood that the panel 102A, 102B and 102C need not be flat but can also have surfaces in three dimensions, if desired, for example to replicate or emulate another vehicle or non-motorized vehicle object.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An arrangement for testing a test vehicle or a system on the test vehicle for warning the presence of an object proximate the test vehicle or a system to avoid a collision, comprising:
   a self-powered and independently movable target separate from the test vehicle, configured to be positioned proximate to the test vehicle, the target comprising:
      a support frame with wheels,
      a motor operably coupled to at least one wheel,
      brakes operably coupled to each wheel,
      a control system coupled to the motor, brakes and wheels and configured to control acceleration, braking and steering of the wheels, and
      a collision avoidance system operable with the control system and configured to control the target to avoid a collision with the test vehicle; and
   a ground effect system configured to create a vacuum under the target.

2. The arrangement of claim 1 wherein the ground effect system includes a fan configured to create a vacuum under the target.

3. The arrangement of claim 1 further comprising a first wireless communication device apart from any system under test and configured to be mounted on the test vehicle, and
   wherein the target includes a second wireless communication device in communication with the first wireless communication device and operably coupled to the collision avoidance system,
      the collision avoidance system configured to control the target based on information received from the second wireless device.

4. The arrangement of claim 1 wherein the control system is configured to selectively provide more torque to one wheel over another wheel.

5. The arrangement of claim 1 further comprising a plurality of self-powered, independently movable targets configured to be positioned proximate the test vehicle,
   each target of the plurality of targets comprising:
      a support frame having wheels,
      a motor operably coupled to the wheels,
      brakes operably coupled to each wheel,
      a control system coupled to the motor, brakes and wheels and configured to control acceleration, braking and steering of the wheels, and
      a collision avoidance system operable with the control system and configured to control the target to avoid a collision with the test vehicle.

6. The arrangement of claim 1 wherein the target has at least one of longitudinal acceleration or lateral acceleration better than the test vehicle.

7. The arrangement of claim 6 wherein longitudinal acceleration is at least 25% better than the test vehicle.

8. The arrangement of claim 6 wherein longitudinal acceleration is at least 50% better than the test vehicle.

9. The arrangement of claim 6 wherein longitudinal acceleration is at least 75% better than the test vehicle.

10. The arrangement of claim 6 wherein lateral acceleration is at least 50% better than the test vehicle.

11. The arrangement of claim 6 wherein lateral acceleration is at least 100% better than the test vehicle.

12. The arrangement of claim 6 wherein lateral acceleration is at least 150% better than the test vehicle.

13. The arrangement of claim 1, wherein the ground effect system further includes a cavity formed in a panel under the target and fluidly coupled to a fan.

14. A method for testing a test vehicle or a system on the test vehicle for warning the presence of an object proximate the test vehicle or a system to avoid a collision, comprising:
   maneuvering a test vehicle in a test situation proximate to a self-powered and independently movable target separate from the test vehicle, wherein maneuvering comprises maneuvering the test vehicle such that it approaches the target from behind, the target comprising a support frame with wheels, a motor operably coupled to one or more wheels, and a control system coupled to the motor and configured to autonomously control acceleration to avoid the test vehicle from striking the target, and the target including one or more performance characteristics better than that of the test vehicle;
   monitoring for a likelihood of a collision between the test vehicle and the target using a collision avoidance system of the target; and
   maneuvering the target autonomously in accordance with the monitoring by accelerating the target to avoid a collision with the test vehicle.

15. The method of claim 14 comprising maneuvering a plurality of targets, each target being maneuvered during the test, each target having one or more performance characteristics better than that of the test vehicle.

16. The method of claim 14 wherein said one or more performance characteristics better than that of the test vehicle comprises at least one of longitudinal acceleration or lateral acceleration better than the test vehicle.

17. The method of claim 16 wherein the longitudinal acceleration of the target is at least 25% better than the test vehicle.

18. The method of claim 16 wherein the longitudinal acceleration of the target is at least 50% better than the test vehicle.

19. The method of claim 16 wherein the longitudinal acceleration of the target is at least 75% better than the test vehicle.

20. The method of claim 16 wherein the lateral acceleration of the target is at least 50% better than the test vehicle.

21. The method of claim 16 wherein the lateral acceleration of the target is at least 100% better than the test vehicle.

22. The method of claim 16 wherein the lateral acceleration of the target is at least 150% better than the test vehicle.

23. The method of claim 14 wherein the target comprises a ground effect system configured to create a vacuum under the target and maneuvering comprises creating a vacuum under the target.

24. The method of claim 14, wherein the target is a facsimile of a vehicle without a configuration to carry a person.

25. A wheeled apparatus comprising:
   a support frame with wheels;
   a motor operably coupled to one or more wheels;
   brakes operably coupled to each wheel;
   a control system coupled to the motor, brakes and the wheels and configured to autonomously control acceleration, braking and steering of the wheels;
   a collision avoidance system operable with the control system and configured to avoid a collision with a test vehicle; and
   a ground effect system configured to create a vacuum between a downwardly facing panel on a carriage of the wheeled apparatus and a surface upon which the apparatus travels upon, wherein the ground effect system includes a fan and a cavity in the downwardly facing panel fluidly coupled to the fan.

26. The wheeled apparatus of claim 25 wherein the motor comprises an electric motor.

27. The wheeled apparatus of claim 25 wherein the motor comprises an internal combustion engine.

* * * * *